Feb. 1, 1927.
H. HANSEN
1,616,221
AUTOMOBILE SIGNALING APPARATUS
Filed Sept. 16, 1925
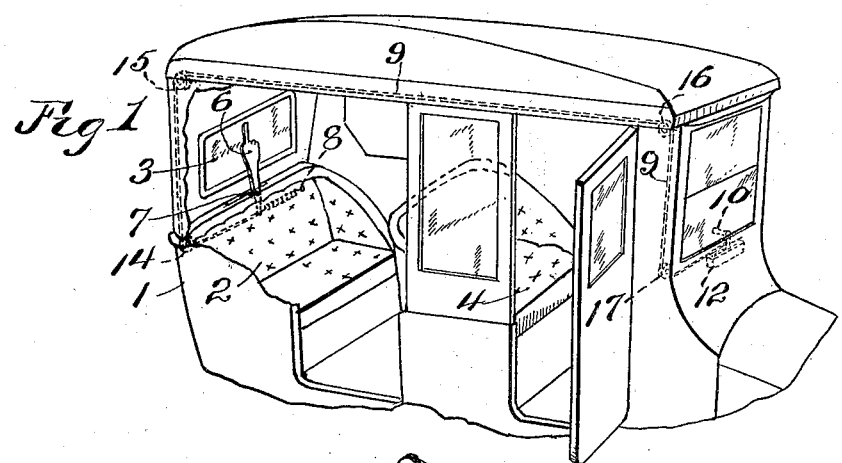
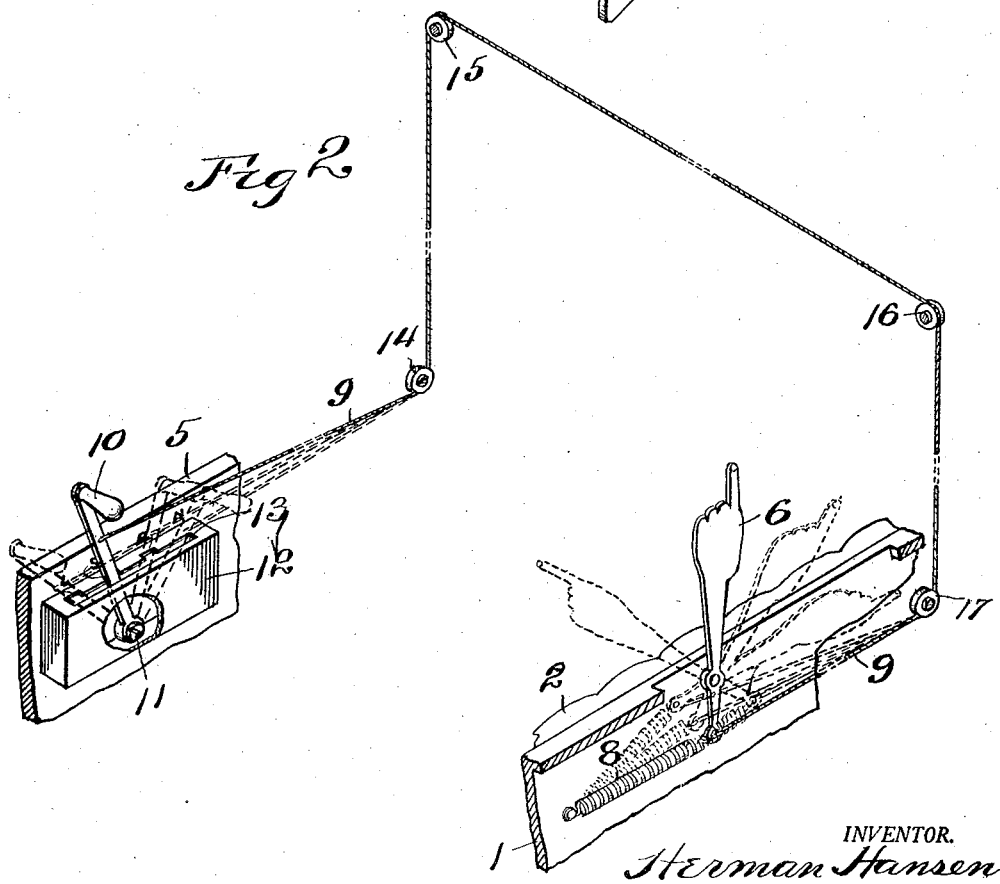
INVENTOR.
Herman Hansen
BY
Warren L. House
His ATTORNEY.
Witness:
R. E. Hamilton Patented Feb. 1, 1927.

1,616,221

UNITED STATES PATENT OFFICE.

HERMAN HANSEN, OF KANSAS CITY, MISSOURI.

AUTOMOBILE SIGNALING APPARATUS.

Application filed September 16, 1925. Serial No. 56,635.

My invention relates to improvements in automobile signaling apparatus.

My invention may be used on open cars, but it is particularly well adapted for use in connection with closed cars.

One of the objects of my invention is to provide a novel signaling apparatus with which the operator of the car may display at the rear window proper signals for indicating to following drivers his intentions as to direction of movement.

A further object of my invention is to provide a signaling apparatus of the kind described, which is simple, cheap to install, which is durable and not liable to get out of order, which is located wholly within the car so as to be protected from the action of the elements, which is convenient and easy to operate, and which is reliable in its operation.

The novel features of my invention are hereinafter fully described and claimed.

In the accompanying drawing, which illustrates the preferred embodiment of my invention, Fig. 1 is a perspective view of a portion of a closed car provided with my improvement.

Fig. 2 is an enlarged perspective view of my improved signaling apparatus and portions of a car body on which it is mounted, such portions being broken away.

Similar reference characters designate similar parts in the different views.

1 designates an ordinary closed car body having a back seat 2, a rear window 3, a driver's seat 4, and an instrument board 5 in front of the driver's seat.

A pointer 6 is pivoted on a horizontal longitudinal bolt 7 mounted centrally in the upper portion of the back of the seat 2 below the rear window 3, so as to be swung from a neutral position below the window 3, in which it will be invisible from the rear of the car, to three positions in front of the window 3, viz, a vertical, or stop position, and two oppositely inclined positions at opposite sides respectively of the vertical position, for indicating right and left turns about to be made.

A coil spring 8 is attached at one end to the pointer 6 below the bolt 7, and extends horizontally laterally at one side of the axis of the pointer, and has its other end attached to the body 1 back of the seat 2. The tension of the spring 8 normally forces the pointer 6 to the neutral position below the window 3.

For swinging the pointer 6 from the neutral position to the desired one of the three indicating positions above described, there is provided flexible means, preferably a cord 9 which is attached at one end to the pointer 6 below the bolt 7, and which is attached at its other end to an operating member comprising a lever 10, which is pivoted loosely on a horizontal bolt 11 in a casing 12, which is fastened to the rear side of the instrument board 5, where it will be easily accessible to the driver occupying the seat 4. The operating member extends through a slot 13 in the upper edge of the casing 12, said slot having three locking notches respectively designated by R, S and L, corresponding in positions respectively to the right, stop and left positions of the pointer 6.

In alinement with the spring 8, but at the opposite side of the axis of the pointer 6, is a bearing, which may be a roller 14, mounted in the body 1 at the inner side thereof. The cord 9 passes from the pointer 6 to and has running engagement with the roller 14, and passes from there upwardly to and over a roller 15 mounted in the rear upper corner of the top of the body, thence forward to and over a roller 16 mounted in the upper right corner of the body, thence downwardly to and over a roller 17 mounted in the body 1 at the right of the casing 12, and thence to the operating member 10 to which it is fastened above the casing 12.

Normally, the pointer 6 and the operating member 10 are in the neutral position, the member 10 being in the position in the slot 13 at the rear of the indicating character N, and the pointer below the rear window 3, out of sight from the rear of the car. If the driver of the car is going to make a right turn, he swings the operating member 10 in the slot 13 to and into the notch R, Fig. 2, thereby swinging the pointer 6 to the position inclining toward the right, as viewed from the rear of the car. If he is to make a left turn, he swings the operating member 10 into the notch L, thereby swinging the pointer to the position inclined to the left, as viewed from the rear. If he is going to make a stop, he swings the operating member 10 into the notch S, thereby disposing the pointer 6 in the vertical, that is, the "stop" position.

After having completed the indication, the operator swings the operating member 10 to the neutral position N, upon which the spring 8 forces the pointer 6 to the neutral hidden position.

The operating member 10 is held releasably locked in the notch in which it is disposed by the pull of the cord 9 caused by the pull of the spring 8. The width of the slot 13 is sufficient to permit the operating member 10 to be freely swung laterally into and out of the notches.

It will be noted that all parts of the apparatus are located within the body of the car and are thereby protected from the action of the elements, such as snow or ice, which, otherwise might interfere with the proper operation of the apparatus.

I do not limit my invention to the structure shown and described, as many modifications, within the scope of the appended claim, may be made without departing from the spirit of my invention.

What I claim is:—

In an automobile signaling apparatus, the combination with an automobile body having a seat back provided with an opening extending downwardly from its upper edge, said body having a rear window disposed above said opening, of a pointer movable in said opening from a position below said window to different positions in which it will be disposed in alinement with said window, and means for moving said pointer to and from said positions.

In testimony whereof I have signed my name to this specification.

HERMAN HANSEN.